UNITED STATES PATENT OFFICE.

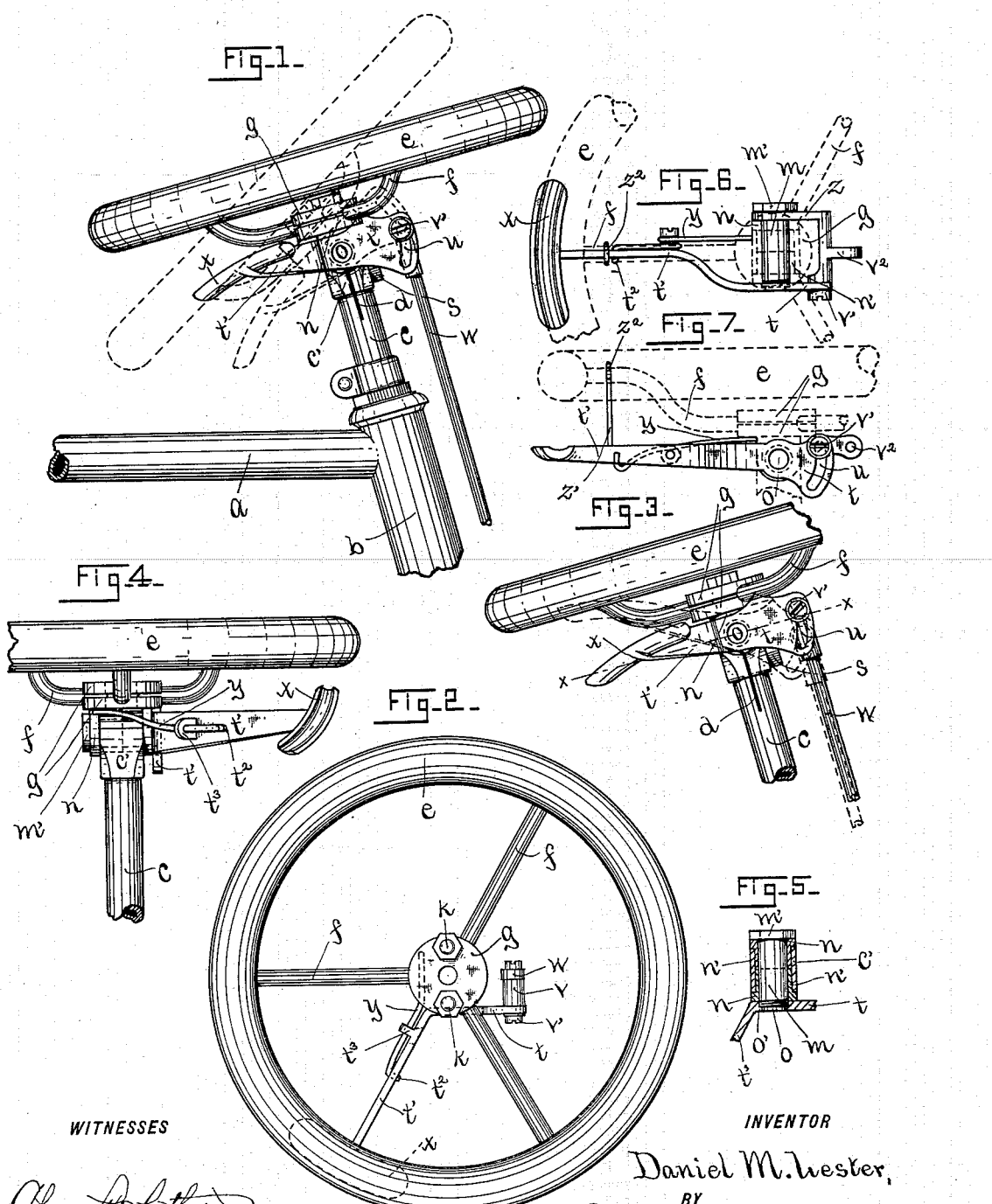

DANIEL M. LESTER, OF NORWICH, CONNECTICUT.

BICYCLE-BRAKE.

SPECIFICATION forming part of Letters Patent No. 612,044, dated October 11, 1898.

Application filed January 24, 1898. Serial No. 667,680. (No model.)

*To all whom it may concern:*

Be it known that I, DANIEL M. LESTER, a citizen of the United States, residing at Norwich, New London county, State of Connecticut, have invented certain new and useful Improvements in Bicycle-Brakes, which improvements are fully set forth and described in the following specification, reference being had to the accompanying sheet of drawings.

The object of this invention is to provide brake mechanisms applicable particularly to certain steering mechanism for bicycles.

To assist in explaining my newly-invented device, I have provided the accompanying drawings, illustrating the same in connection with said steering mechanism, as follows:

Figure 1 is an elevation of a portion of the steering-head of a bicycle fitted up with said steering mechanism, the latter having my newly-invented brake applied thereto. Fig. 2 is a plan view of said steering mechanism and brake. Fig. 3 is a view similar to Fig. 1, but with the steering-head of the bicycle omitted. Fig. 4 is a rear side elevation of said steering mechanism and brake. Fig. 5 is a sectional view taken on line $xx$ of Fig. 3. Figs. 6 and 7 illustrate, in plan and elevation, respectively, a certain modification of my invention.

That the application of my newly-invented brake to the above-mentioned steering mechanism may be readily understood I will first describe briefly the latter.

Referring now to the drawings, the letter $a$ denotes a portion of a bicycle-frame, $b$ the steering-head, and $c$ the steering-post. The upper end of post $c$ supports the said steering mechanism, the most prominent feature of which is a hand-wheel the rotation of which imparts corresponding motion to the post $c$ and thus accomplishes the steering of the bicycle.

The letter $e$ denotes the rim of said hand-wheel, and $f$ its spokes, which latter are clamped between a two-part hub composed of the disks $g$. Disks $g$ are clamped together and upon the inner ends of spokes $f$ by means of two bolts $h$, passing through said disks at points diametrically opposed, and the lower disk $g$ has secured to its under side two depending lugs $n$. Each lug $n$ bears a tube-section $n'$, which when said lugs are secured in position form a continuous tube, as shown in Fig. 5.

The upper end of steering-post $c$ is provided with the head portion $c'$, bored horizontally to receive the tube-sections $n'$, which latter in assembling the steering device are introduced therethrough from its opposite ends and abut each other midway the head $c'$, as shown in Fig. 5. The tubes $n'$ thus provide an axial support for the said steering mechanism, and in order that said tubes may be adjustably held in the head $c'$ the post $c$ is slotted, as at $d$, from the hole in said head provided to receive tubes $n'$, and a clamping-screw $s$ is provided, by means of which construction the complete steering device may be held rigidly at any desired angle relatively to the steering-post.

My newly-invented brake mechanism, designed to operate with the steering mechanism just described, consists of a brake-lever having a plate portion $t$ and an arm portion $t'$, formed of a single piece of metal or rigid relatively to each other and forming an angle to each other, as here shown. This angle-lever is mounted upon one end of a tube $m$, passing through and adapted to rotate within the tubes $n'$ of the steering mechanism already described. One end of tube $m$ bears the head $m'$ and the opposite end (upon which said lever is mounted) is threaded, and in assembling the parts said threaded end is screwed into a hole $o$ in plate $t$, tapped to receive the same, until said threaded end abuts a shoulder $o'$ in said hole $o$, this construction resulting in retaining the plate portion of the brake-lever at right angles to tube $m$, and it will be seen that the latter provides an axial support for the brake-lever and rocks the same. Plate portion $t$ of the angle-lever has cut therethrough a slot $u$, concentric with the supporting-tube $m$. In said slot is adjustably secured one end of a stud $v$ by means of a clamping-screw $v'$, which stud has secured to its opposite end, in line with the vertical center of the machine-frame, the upper end of the rod $w$ of the well-known plunger-brake, which rod, it is assumed, bears a brake-shoe upon its lower end adjacent to the tire of the forward wheel of the bicycle, in accordance with the usual construction. The arm portion $t'$ of the angle-lever bears at its free end a handle $x$, parallel with and at such a distance beneath the rim $e$ of the hand-wheel as to be within easy reach of the rider when desired for use. To retain said angle-lever in the position just described—that is to say, the position shown in full lines in Figs. 1, 3, and 4, it being assumed that the brake-shoe is then out of contact with the forward wheel of the bicycle—a spring $y$ is provided, secured to arm $t'$ of said lever by passing through the same at the point $t^2$ and through a lug $t^3$ formed thereon, the free end of which spring is bent upward and engages the under side of the lower disk $g$. Spring $y$ acts constantly to force the said arm $t'$ of the angle-lever downward, and to limit such downward movement to the position shown, the upper edge of plate portion $t$ of said lever is adapted to engage one of the spokes $f$ of the hand-wheel.

When it is desired to apply the brake to the forward wheel, handle $x$ is drawn upward and the angle-lever rocked to force the brake-shoe downward into engagement with the tire of the forward wheel, as shown in dotted lines in Fig. 3. When handle $x$ is released, the spring $v$ at once returns the angle-lever to its normal position, thereby removing the brake-shoe from contact with the tire of the wheel, said angle-lever being limited in its return movement to the position shown by reason of the contact of the plate $t$ with the spoke $f$.

It will be seen by reference to the drawings that angle-lever $t$, being mounted upon tube $m$ and adapted to rock on a common axial line with the steering mechanism, may be rocked with the latter and is therefore operative at any angle to which the wheel may be adjusted, it being necessary, of course, to correspondingly adjust the stud $v'$ in the slot $u$, so that the position of plunger-rod $w$ will be unaffected. (See particularly dotted lines in Fig. 1.)

In Figs. 6 and 7 I have shown a modification of my invention, which consists in carrying the arm $t'$ of the brake-lever rearward in line with the vertical center of the machine. The said lever is provided with a spring $y$, mounted thereon and operating in substantially the manner already described. The plate portion $t$ of the angle-lever is substantially like that of my preferred form and permits of the adjusting of the steering mechanism; but the stud $v'$ is provided with a rearwardly-extending plate $z$, which is hung upon tube $m$, near the headed end $m'$ thereof. Stud $v'$ bears midway its length an eye $v^2$, to which the plunger-rod is attached. If desired, an upwardly-extending wire $z'$ may be secured to arm $t'$ of the lever, which wire has a hook portion $z^2$, adapted to hook over one of the spokes $f$ to limit the downward travel of the arm, as shown in Fig. 7. By means of this modified form of my device a more direct leverage is made possible; but the first described is preferable, in most instances, being more convenient to operate.

Thus far I have described my new form of brake-operating mechanism as applied to a stem $c$, having the steering-wheel jointed or hinged thereto; but it will be obvious that the brake-lever would work equally well with a wheel having a non-jointed support, in which case the lever $t$ would be fulcrumed on a stud or screw secured rigidly in said stem. Whether or not the steering-wheel is hinged to its support, the brake-lever $t$ is located below the plane of the wheel and is provided with an arm $t'$, terminating in a handle $x$, adapted to coöperate with the wheel-rim.

My device as a whole is of very simple construction, consists of few parts, is operated as conveniently as brakes now in common use, and is a very desirable attachment to the steering mechanism above described.

Having thus described my invention, I claim—

In combination, in and with the steering-head of a bicycle, a hand-wheel, a jointed support for said wheel, a brake-operating lever fulcrumed in said joint, a spring connected with said lever and acting with a constant tendency to hold the said lever from engagement with said wheel, and means consisting of the stop $z^2$ for limiting the movement of said lever, all substantially as specified.

DANIEL M. LESTER.

Witnesses:
FRANK H. ALLEN,
ALONZO M. LUTHER.